United States Patent Office 3,197,453
Patented July 27, 1965

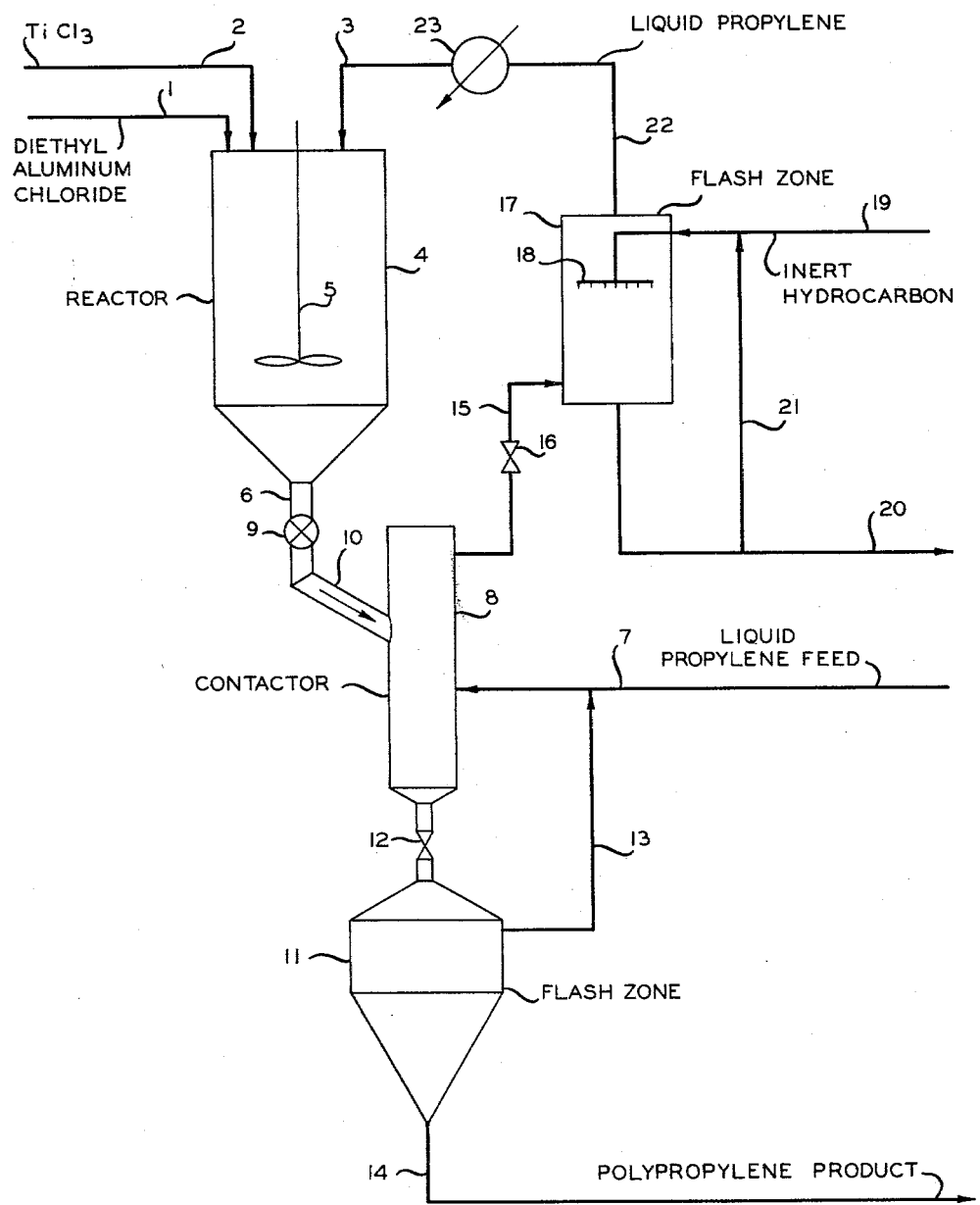

3,197,453
PROCESS FOR PURIFYING MONOMER FEEDS
FOR POLYMERIZATION PROCESSES
Arthur A. Harban, Bartlesville, Okla., assignor to Phillips
Petroleum Company, a corporation of Delaware
Filed July 11, 1961, Ser. No. 123,185
11 Claims. (Cl. 260—93.7)

This invention relates to polymerization. In accordance with one aspect, this invention relates to a novel process for the purification of monomer feed streams. In accordance with another aspect, this invention relates to an improved process for purifying the monomer feed and removing catalyst residues and soluble polymer in the effluent of a polypropylene process employing a heterogeneous catalyst or initiator system.

The polymerization of olefins, particularly propylene, to high molecular weight resins is well known and it is recognized that highly crystalline polymers, frequently designated as isotactic polypropylene, are preferred for most practical applications. A well known procedure for the production of polymers of high isotactic content involves polymerization of propylene in the presence of a catalyst system comprising an organometal, preferably an alkyl aluminum compound, and titanium trichloride. These catalysts are highly sensitive to oxygen, water, and other contaminants and their presence, even in very small amounts in a polymerization system, leads to severe reduction in catalyst activity and can inhibit the polymerization reaction altogether. By suitable adjustment of reaction conditions, selection of catalyst components and other process modifications, polymers having a high isotactic content can be produced. However, there is generally present in these polymers at least a small amount of soluble amorphous polymer which has a detrimental effect on their physical properties for some applications. In many instances the polymer product is subjected to an extraction step for removal of these materials. As will be apparent, pretreatment of the monomer to remove catalyst poisons and post-treatment of the polymer to remove soluble amorphous fractions introduces into the process expensive and time consuming operations, added equipment, and the like.

According to the invention, a process is provided for rendering catalyst poisons in the monomer feed innocuous while at the same time inactivating or short-stopping catalyst in the polymerization effluent.

Accordingly, an object of this invention is to provide a novel process for purifying the feed in a polymerization process employing a heterogeneous catalyst system.

Another object of this invention is to provide a process for removing soluble catalyst residues and soluble polymer from the effluent of an olenfin polymerization process.

A further object of this invention is to provide an improved process for the mass polymerization of propylene in the presence of a heterogeneous catalyst system.

Other objects, advantages and features of this invention will be obvious to those skilled in the art having ben given this disclosure.

According to the invention, I provide an improved process for purifying an impure monomer feed which comprises intimately contacting said feed with the effluent from an organometallic initiated polymerization process containing active catalyst residues which deactivate impurities present in said feed, and recovering said feed substantially free of impurities.

It has been found that the catalyst residues present in the effluent from an organometallic polymerization system act as a purification means and are effective for rendering innocuous or scavenging catalyst poisons from the monomer feed. It is known that various materials such as moisture, oxygenated compounds such as alcohols and ethers, sulfur compounds such as mercaptans and thiophenes, alkaline nitrogen compounds, acetylenic materials, and in some cases compounds containing halogens tend to deactivate organometallic initiator or catalyst systems and promote undesirable side reactions so as to alter adversely the characteristics and yield of the desired polymer product. By the practice of the present invention, such materials are removed from the monomer feed by contacting the feed with the polymerization effluent. The polymerization effluent will contain at least a small amount of active catalyst residue and when contacted with the monomer feed stream these residues serve to scavenge catalyst poisons therefrom.

In certain polymerization systems, for example in the mass polymerization of propylene, soluble fractions in the polymerization effluent are extracted into the propylene monomer feed during such contacting along with any soluble catalyst residues which may be present in addition to deactivation of monomer feed impurities. In such a system, the propylene feed stream, after contacting the polymerization effluent, is preferably conveyed to a flash zone wherein it is passed through a spray of a high boiling inert hydrocarbon, for example, under conditions such that the soluble polymer and catalyst residue present therein are removed. The propylene feed freed of these materials can then be passed to the polymerization zone. However, if desired, the treated monomer stream can be passed to a further purification before being sent to a place of utilization.

The present invention is especially applicable to the purification of the propylene feed passed to a mass polymerization process for the production of polypropylene employing any of the well known organometallic catalyst or initiator systems active for the polymerization of propylene to a solid homopolymer. The reaction system to which this invention is particularly applicable is the mass, i.e. no extraneous diluent is employed in the polymerization, in the presence of a catalyst mixture formed by mixing (a) a dialkyl aluminum halide compound wherein the alkyl groups contain from 1 to 12, inclusive, carbon atoms and (b) titanium trichloride, e.g. aluminum reduced $TiCl_4$. While not essential to the operation of the invention, it is frequently desirable to conduct the polymerization in the presence of elemental hydrogen. When so operating, hydrogen is added in an amount sufficent to provide from 0.15 to 0.40 mol percent hydrogen in the liquid propylene phase in the polymerization zone. By this means productivity of the catalyst and flexural modulus values of the polypropylene product are increased. Carrying out the polymerization in the presence of hydrogen as set forth above is described and claimed in copending application having Serial No. 102,954, filed April 14, 1961.

As indicated above, the mass polymerization of propylene is preferably carried out in the presence of a two-component catalyst system, i.e. (a) a dialkyl aluminum halide compound and (b) titanium trichloride (e.g. aluminum reduced $TiCl_4$). The dialkyl aluminum halide compound can be represented by the formula RR'AlX wherein R and R' are selected from alkyl groups having from 1 to 12, inclusive, carbon atoms, wherein R and R' can be the same or different alkyl groups, and X is a halogen selected from chlorine, bromine, iodine, or fluorine, preferably chlorine. The second component of the catalyst system is preferably aluminum reduced $TiCl_4$, which is formed by reacting aluminum with titanium tetrachloride. The preferred aluminum reduced $TiCl_4$ can be described as being of the composition $TiCl_3 \cdot XAlCl_3$ in which X is a number in the range 0.1 to 1.0. A convenient method for the preparation of such an aluminum reduced TiCl₄ is by reduction of titanium tetrachloride with metallic aluminum to form a complex having the formula $$3TiCl_4 \cdot AlCl_3$$

This reaction is generally carried out at an elevated temperature, for example, at a temperature in the range of 300 to 650° F., preferably 375 to 450° F.

The amount of catalyst employed in the polymerization of propylene when utilizing the above described catalyst components can vary over a rather wide range. The amount of dialkyl aluminum halide used should be at least $1.0 \times 10^{-4}$ gm./gm. of monomer and can be as much as $25 \times 10^{-4}$ gm./gm. of monomer. The amount of titanium trichloride complex employed will generally be in the range between $1.5 \times 10^{-4}$ and $10 \times 10^{-4}$ gm./gm. of monomer. The mol ratio of dialkyl aluminum halide to titanium trichloride complex ordinarily ranges from 1.0:0.005 to 1.0:50.0, preferably 1.0:0.1 to 1.0:10.0.

The polymerization is ordinarily carried out at a temperature in the range 105 to 125° F. when hydrogen is employed in a mass polymerization system for propylene as described in the copending application, supra. However, for other systems higher or lower temperatures can be employed when desired. The pressure employed in the polymerization zone is sufficient to maintain a liquid monomer phase. The residence time for polymerization ordinarily ranges from 5 minutes to 20 hours or longer, preferably from 1 to 5 hours.

As mentioned above, the preferred polymerization according to the invention is conducted in a mass system wherein the propylene is in liquid phase, and the polymerization is carried out without the addition of more than small amounts of an inert diluent. As is well known, commercially produced propylene ordinarily contains minor amounts, for example up to 10 percent, of saturated inert materials, such as paraffinic hydrocarbons, and it is intended that the use of these commercial propylene products as polymerization feed stocks is included within the scope of the invention. The term "small amounts of an inert diluent" is, therefore, to be taken to mean such small amounts of inert diluent as are introduced into the reaction zone by way of inert saturated hydrocarbons in the propylene feed and inert diluent employed for ease of handling of the dialkyl aluminum halide compound.

A better understanding of the invention will be obtained upon reference to the accompanying drawing which shows schematically a preferred embodiment of the invention in which propylene is polymerized in the present of a catalyst system of diethylaluminum chloride and titanium trichloride, the reaction being effected in liquid propylene as the reaction medium.

Referring now to the drawing, diethylaluminum chloride by way of line 1, titanium trichloride by way of line 2 and liquid propylene by way of line 3 are introduced into reactor 4 having an agitator 5. The mol ratio of diethylaluminum chloride to titanium trichloride in polymerization reactor 4 in generally the range between 2:1 and 5:1 and the amount of total catalyst in the reaction zone is about 1 lb. per 1000 lbs. of propylene feed. The temperature maintained in the polymerization zone is preferably maintained within the range 105 to 125° F. and the pressure employed is sufficient to maintain a liquid propylene phase within reactor 4. If desired hydrogen can be introduced separately into the reactor (not shown) when it is desired to improve productivity of polymer as well as improving the polymer properties.

As the polymerization reaction proceeds within reactor 4, pulverulent polypropylene collects in settling leg 6. Periodically, polypropylene product collected in leg 6 is passed through valve 9 and line 10 and introduced into contactor 8. The polypropylene product removed from reactor 4 and passed to contactor 8 contains a small amount of catalyst residue, a small amount of other soluble fractions in the polymer as well as unreacted liquid propylene. The effluent from reactor 4 is preferably introduced into an upper portion of contactor 8.

According to the invention, a liquid propylene feed stream is introduced into a lower portion of contactor 8 by way of line 7. The temperature in contactor 8 is preferably maintained about 20° F. below that in reactor 4. By so operating, a sufficient pressure gradient will be maintained between reactor 4 and contactor 8 so that polymer collected in settling leg 6 will flow through valve 9 and conduit 10 into the rising propylene stream in the contactor. When the polymerization reaction is carried out at a temperature of 110° F., for example, the pressure in this zone will be about 230 p.s.i.g. and, by maintaining the temperature in contacting tower 8 at 90° F., a pressure differential of about 55 p.s.i.g will be established. While such a pressure gradient between these zones provides convenient operating conditions, it should be understood that a pressure gradient is not essential to the operation of this invention. In the absence of a pressure differential, a screw conveyor, for example, or other suitable means can be used in conduit 10 whereby the polymer is transported into the contacting tower or zone.

In contactor 8, polymer falls downwardly countercurrent to the liquid propylene feed and the catalyst residues contained therein react with impurities present in the propylene feed stream and at the same time propylene solubles in the polymer stream are extracted by the liquid propylene. The falling polypropylene particles collect at the bottom of the contactor 8 and are released therefrom through valved line 12 into flash zone 11 wherein propylene is released from the polymer and returned to line 7 by way of line 13. Polypropylene product is removed for further processing, for example removal of catalyst by alcohol or other treatment, by way of line 14.

The liquid propylene feed introduced by line 7 into a lower portion of contactor 8 moves upwardly through the contactor countercurrent to downwardly moving finely divided polypropylene product and is removed along with propylene soluble materials from an upper portion of contactor 8 by way of line 15 having valve 16. The liquid propylene is line 15 is introduced into a lower portion of flash zone 17 where it is contacted with a heated spray of a high boiling inert hydrocarbon such as white mineral oil, a purified lube stock, or the like, which is introduced into flash zone 17 by way of line 19 and spray header 18. The inert hydrocarbon employed should be free from volatile fractions and boil at a temperature at least 20° F. above the temperature maintained in the flash zone. The inert hydrocarbon serves to remove propylene soluble materials contained in the liquid propylene feed extracted from the polypropylene product in contactor 8. The temperature of the inert hydrocarbon spray should be at least as high as that of the incoming propylene stream and preferably is between 100 and 200° F. Vaporous propylene, substantially free of impurities, is removed overhead from flash zone 17 by way of line 22 and is then passed through heat exchanger 23 wherein it is cooled to the liquid state before being introduced into feed line 3 and reactor 4.

The inert hydrocarbon spray oil introduced into flash zone 17 by way of spray header 18 containing soluble impurities scrubbed from the propylene feed in zone 17 is removed from a lower portion of zone 17 by way of line 20 for treatment in a recovery zone (not shown) and recycled to the system. In the recovery zone (not shown), the propylene soluble materials contained in the inert hydrocarbon oil can be separated from the spray oil by conventional means. A recycle line 21 can be employed for circulation of a portion of the oil withdrawn from flash zone 17 through line 20 without being sent to a purification or recovery zone.

Although contactor 8 is shown in the drawing as being a countercurrent contacting zone for contacting liquid propylene monomer feed with the polypropylene product, it should be understood by those skilled in the art that other types of contactors well known in the art can also be employed so long as intimate contact is obtained between the feed and product. As indicated above two functions are realized when the solid polymer from the propylene polymerization zone is contacted with the liquid propylene in contactor 8, namely (a) catalyst poisons which may be present in the propylene feed stream are destroyed by catalyst residues on the polypropylene polymer particles and (b) at least a portion of the propylene soluble materials which may be present in the polypropylene effluent are removed by the liquid propylene stream in the contactor. Thus, any suitable contacting means whereby these two functions can be satisfactorily accomplished can be employed according to the invention. Also, according to the invention, as set forth above, subsequent to this contacting step the dissolved materials are removed from the propylene feed preferably in a flash zone; however, other suitable means for separating the propylene from the dissolved materials can be employed at this time.

The polypropylene product produced in accordance with this invention has utility in applications where solid plastics are used. It can be molded to form articles of any desired shape such as bottles and other containers for liquids. Furthermore, it can be formed into pipe by extrusion.

A more compresensive understanding of the invention can be obtained by reference to the following illustrative example which is not intended, however, to be unduly limitative of the invention.

SPECIFIC EXAMPLE

A specific embodiment is described wherein propylene is polymerized in liquid phase in the presence of hydrogen and a catalyst consisting of diethylaluminum chloride (DEAC) and titanium trichloride complex (aluminum reduced $TiCl_4$). All rates are given in lbs. per stream hour in Table I below unless otherwise stated. The embodiment will be described in conjunction with the drawing.

ter, mercaptans, nitrogen-containing compounds and the like. These compounds are deactivated or render innocuous as the propylene feed is being contacted with the polypropylene product, which contains catalyst residues that react with the impurities present in the liquid propylene in contactor 8. At the same time propylene soluble materials in the polypropylene product are extracted by the liquid propylene feed during countercurrent contacting in contactor 8.

The contacted polypropylene effluent, reduced in propylene soluble materials, is removed from the base of tower 8, subjected to flashing conditions (80° F. and 15 p.s.i.g.) in zone 11 to remove residual propylene which is returned by way of line 113 to the contactor, and the polypropylene product is recovered in line 14 for further processing as desired. The liquid propylene feed, which contains propylene soluble materials extracted in tower 8, is removed overhead by line 15 from tower 8 and passed to flash zone 17 wherein the soluble materials are scrubbed from the propylene by a spray of mineral oil. Zone 17 is operated at a temperature of 100° F. and 150 p.s.i.g. The white mineral oil containing propylene soluble materials scrubbed from the propylene feed in zone 17 is removed from the base of flash zone 17 by way of line 20. A vaporous stream of propylene, which is substantially free of impurities, is taken overhead from zone 17 and then subjected to cooling in zone 23 to liquefy the propylene, which is then passed to the reactor and subjected to polymerization conditions.

Although the present invention has been described primarily in connection with the purification of a liquid propylene feed being passed to a mass polymerization for the production of "particle form" or pulverulent polypropylene, it should be realized by those skilled in the art that the present invention is equally applicable to other olefin polymerizations utilizing organometallic initiator systems. Also, the invention is applicable to the utilization of the polymerization effluent from organometallic initiated solution systems as well as organometallic initiated solid polymer systems. In a solution system, for

TABLE I

*Stream—lbs./hr.*

| Component | 1 | 2 | 10 | 12 | 13 | 7 | 15 | 20 | 3 | 14 |
|---|---|---|---|---|---|---|---|---|---|---|
| Propylene | | | 18,600 | 18,600 | 18,600 | 10,000 | 28,600 | | 28,600 | |
| Cyclohexane | 12.0 | 86.0 | 98 | | | | 98 | 98 | | |
| Hydrogen [1] | | | | | | | | | | |
| DEAC | 4.0 | | 4 | | | | 4 | 4 | | |
| 3TiCl₃·AlCl₃ | | 14 | 14 | 14 | | | | | | 14 |
| Soluble Polymer | | | 250 | | | | 250 | 250 | | |
| Mineral Oil | | | | | | | | 1,250 | | |
| Polypropylene | | | 10,000 | 10,000 | | | | | | 10,000 |
| Total | 16.0 | 100.0 | 28,966 | 28,614 | 18,600 | 10,000 | 28,952 | 1,602 | 28,600 | 10,014 |
| Temp. ° F | 80 | 80 | 110 | 100 | 80 | 100 | 100 | 100 | 100 | 80 |
| Press., p.s.i.g | 250 | 250 | 250 | 220 | 15 | 220 | 220 | 150 | 150 | 15 |

[1] Hydrogen added to reactor 4 and returned through line B should be sufficient to provide a partial pressure of 7 p.s.i.g. after compensating for losses in the system.

A purified feed stream of liquid propylene is fed to reactor 4 by way of line 3, titanium trichloride is introduced by way of line 2 and diethylaluminum chloride by way of line 1. Reactor 4 is operated at a temperature of 110° F. and a pressure of 250 p.s.i.g. As the polymerization reaction proceeds in reactor 4, pulverulent polypropylene collects in settling leg 6. A mixture consisting of finely divided polypropylene, catalyst residue, and minor amounts of propylene soluble materials is passed through line 10 and introduced into an upper portion of contactor 8, which is operated at a temperature of 100° F. and 220 p.s.i.g.

Liquid propylene is introduced into a lower portion of contactor 8 for countercurrent contacting with polymerization reactor 4 effluent. The liquid propylene feed usually very small amounts, usually measured in parts per million, at least one catalyst poison such as oxygen, waexample, the polymer in solution can be contacted with impure monomer in a suitable contacting zone, and then the purified monomer can be flashed from the polymer solution and passed to the polymerization zone. Furthermore, the present invention is applicable to the purification of monoolefin as well as diolefin monomer streams, e.g., 1,3-butadiene, isoprene, etc., being passed to an organometallic initiated polymerization, e.g., organolithium initiators, by contacting with the polymerization effluent. In such a system, the catalyst poisons function to shortstop or deactivate catalyst in the polymerization effluent.

As will be evident to those skilled in the art, many variations and modifications of this invention can be practiced in view of the foregoing disclosure. Such variations and modifications are clearly believed to come within the spirit and scope of this invention.

I claim:

1. In a mass polymerization process wherein liquid propylene is contacted with a heterogeneous organometallic catalyst mixture active for the polymerization of propylene to solid polymer under polymerization conditions to form solid polypropylene and wherein an effluent containing catalyst residue, solid particulate polypropylene product and propylene soluble materials is removed from said polymerization, the improvement which comprises contacting said effluent before recovery of said product with fresh liquid propylene feed under liquid phase contacting conditions such that catalyst poisons present in said feed are rendered innocuous by said residue and said feed extracts at least a portion of said soluble materials from said effluent, subjecting said feed after said contacting to vaporizing conditions to free it of said soluble materials, and then passing said feed freed of impurities to said polymerization.

2. Process according to claim 1 wherein effluent is passed downwardly in a contacting zone countercurrent to said liquid feed rising upwardly therein and said feed is then contacted in a zone under flashing conditions with an inert liquid hydrocarbon to remove said soluble materials from said propylene.

3. In a process for the mass polymerization of propylene to form solid polypropylene and the presence of liquid propylene in a heterogeneous organometallic catalyst system active for the polymerization of propylene to solid polymer by introducing propylene and catalyst into a polymerization zone, maintaining said polymerization zone under polymerization conditions to polymerize propylene to normally solid polymer, removing from said zone an effluent containing catalyst residue, product particulate polymer, unreacted propylene, and propylene soluble materials, recovering polymer, recovering unreacted propylene and recycling same to said polymerization zone, and adding fresh propylene feed to the system to make up for propylene formed in the polymer, the improvement which comprises contacting said effluent before recovering said product polymer with said propylene feed under liquid phase extraction conditions such that said residue destroys catalyst poisons in said feed and said feed removes propylene soluble materials from said effluent, subjecting said feed after said contacting to flashing conditions to free it of said soluble materials, and conveying said propylene feed freed of impurities along with said recycle to said polymerization zone.

4. Process according to claim 3 wherein said effluent is contacted countercurrently with said propylene feed and said feed is then contacted with an inert liquid hydrocarbon in said flashing to scrub said soluble materials from said propylene before it is passed to sail polymerization zone.

5. An improved process for producing solid polypropylene which comprises contacting liquid propylene with a heterogeneous organometallic catalyst mixture active for the polymerization of propylene to solid polymer in a polymerization zone under polymerization conditions to form said polypropylene, removing from said polymerization zone an effluent stream containing catalyst residue, particulate polypropylene product, unreacted liquid propylene, and propylene soluble materials introducing said effluent into a contacting zone and therein contacting said effluent with fresh liquid propylene feed under contacting conditions such that catalyst inactivating materials present in said feed are rendered innocuous and at least a portion of said soluble materials are extracted from said effluent by said feed, withdrawing polypropylene product from said contacting zone, removing said feed from said contacting zone and passing same to flash zone wherein it is freed of said extracted materials and then passing said propylene feed, freed of impurities, to said polymerization zone.

6. A process according to claim 5 wherein said catalyst is a mixture of (a) a dialkylaluminum halide compound wherein the alkyl groups contain from 1 to 12, inclusive, carbon atoms and (b) titanium trichloride.

7. Process according to claim 6 wherein said polymerization is carried out in the presence of 0.15 to 0.40 percent hydrogen in the liquid propylene phase in said polymerization zone.

8. An improved process for producing solid polypropylene which comprises contacting liquid propylene with a heterogeneous organometallic catalyst mixture active for the polymerization of propylene to solid polymer in a polymerization zone under polymerization conditions to form sail polypropylene, removing from said polymerization zone an effluent stream containing catalyst residue, particulate polypropylene product, liquid propylene, and propylene soluble materials, passing said effluent, directly into an upper portion of a contacting zone, passing said effluent downwardly through said zone countercurrent to upwardly rising liquid propylene feed introduced into a lower portion of said contacting zone, withdrawing solid polypropylene product reduced in propylene soluble materials from a lower portion of said contacting zone, withdrawing liquid propylene feed containing propylene soluble materials as overhead from said zone, introducing said overhead into a flash zone and then flash contacting said propylene with in inert liquid hydrocarbon so as to scrub said propylene soluble and extracted materials therefrom, removing liquid hydrocarbon and scrubbed materials from said flash zone, removing propylene from said flash zone substantially free of impurities and passing same to said polymerization zone as feed.

9. Process according to claim 8 wherein said catalyst is a mixture of (a) dialkylaluminum halid wherein the alkyl groups contain from 1 to 12, inclusive, carbon atoms and (b) titanium trichloride.

10. Process according to claim 9 wherein said polymerization is carried out in the presence of from 0.15 to 0.40 mol percent hydrogen in the liquid propylene phase in said polymerization zone.

11. In a mass polymerization process wherein a liquid feed material selected from the group consisting of propylene, contacted with a heterogeneous organometallic catalyst mixture active for the polymerization of said feed to solid polymer under polymerization conditions to form solid polymer and wherein an effluent containing catalyst residue, solid particulate polymer and feed soluble materials is removed from said polymerization, the improvement which comprises contacting said effluent before recovery of said product with fresh liquid feed under liquid phase contacting conditions such that catalyst poisons present in said feed are rendered inocuous by said residue and said feed extracts at least a portion of said soluble materials from said effluent, subjecting said feed after said contacting to vaporizing conditions to free it of said soluble materials, and then passing said feed freed of impurities to said polymerization.

References Cited by the Examiner

UNITED STATES PATENTS

| | | | |
|---|---|---|---|
| 2,839,518 | 6/58 | Brebner | 260—94.9 |
| 2,910,461 | 10/59 | Nowlin et al. | 260—94.9 |
| 2,943,082 | 6/60 | Cottle | 260—93.7 |

JOSEPH L. SCHOFER, *Primary Examiner.*

MORRIS LIEBMAN, *Examiner.*

UNITED STATES PATENT OFFICE
CERTIFICATE OF CORRECTION

Patent No. 3,197,453 July 27, 1965

Arthur A. Harban

It is hereby certified that error appears in the above numbered patent requiring correction and that the said Letters Patent should read as corrected below.

Column 7, line 26, for "and" read -- in --; line 27, for "in" read -- and --; column 8, line 17, for "sail" read -- said --; line 30, for "in" read -- an --; line 37, for "halid" read -- halide --; same column 8, line 46, before "contacted" insert -- is --.

Signed and sealed this 8th day of February 1966.

(SEAL)
Attest:

ERNEST W. SWIDER
Attesting Officer

EDWARD J. BRENNER
Commissioner of Patents